US007555049B2

(12) United States Patent
Ali et al.

(10) Patent No.: US 7,555,049 B2
(45) Date of Patent: Jun. 30, 2009

(54) RECEIVER-SIDE SELECTION OF DSL COMMUNICATIONS MODE

(75) Inventors: Murtaza Ali, Plano, TX (US); Shahedolla Molla, San Diego, CA (US); Narasimhan Venkatraman, Plano, TX (US); Channamallesh Hiremath, Plano, TX (US); Umashankar S. Iyer, Plano, TX (US); Udayan Dasgupta, Irving, TX (US); Austin Paul Hunt, Dallas, TX (US); Dennis G. Mannering, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 608 days.

(21) Appl. No.: 11/220,089

(22) Filed: Sep. 6, 2005

(65) Prior Publication Data

US 2006/0095581 A1    May 4, 2006

Related U.S. Application Data

(60) Provisional application No. 60/608,394, filed on Sep. 8, 2004.

(51) Int. Cl.
*H04K 1/10* (2006.01)
*H04L 27/28* (2006.01)
*G06F 15/16* (2006.01)
(52) U.S. Cl. ........................ 375/260; 709/232; 375/259
(58) Field of Classification Search ................. 375/260, 375/259; 370/430
See application file for complete search history.

(56) References Cited

U.S. PATENT DOCUMENTS 6,043,810 A * 3/2000 Kim et al. ................... 345/173

| 6,914,981 B2 * | 7/2005 | Wada ................... 379/399.01 |
| 2004/0014466 A1 * | 1/2004 | Jesse et al. ............... 455/422.1 |
| 2005/0080831 A1 * | 4/2005 | Pickerd et al. .............. 708/300 |
| 2005/0270171 A1 * | 12/2005 | Quintero et al. .......... 340/853.1 |
| 2007/0086477 A1 * | 4/2007 | Xiong et al. ................ 370/463 |

OTHER PUBLICATIONS

Asymmetric digital subscriber line transceivers (ADSL), ITU-T Recommendation G.992.1 (International Telecommunications Union, Jun. 1999).
Asymmetric digital subscriber line transceivers 2 (ADSL2), ITU-T Recommendation G.992.3 (International Telecommunications Union, Jul. 2002).
Asymmetric Digital Subscriber Line (ADSL) transceivers—Extended bandwidth ADSL2 (ADSL2+), Recommendation G.992.5 (International Telecommunications Union, May 2003).

* cited by examiner

*Primary Examiner*—David C Payne
*Assistant Examiner*—Brian J Stevens
(74) *Attorney, Agent, or Firm*—Steven A. Shaw; W. James Brady; Frederick J. Telecky, Jr.

(57) ABSTRACT

A client premises digital subscriber line (DSL) modem having multi-mode capability is disclosed. In initialization, the modem estimates whether channel conditions are such that digital processing of the received data according to a lower data rate DSL standard, such as ADSL2, may result in a higher effective data rate than receipt and processing according to a higher data rate DSL standard, such as ADSL2+. If so, the DSL modem configures itself, such as by configuring its filter characteristics and sampling frequency, to receive and process data according to the lower data rate DSL standard; the transmitting modem, for example at a central office or service area interface, may continue to operate according to the higher data rate standard (with its bit loading corresponding to a subset of subchannels). The receiving DSL modem processes the payload data according to the lower standard, while processing control messages according to the higher standard.

20 Claims, 4 Drawing Sheets

RECEIVER-SIDE SELECTION OF DSL COMMUNICATIONS MODE

CROSS-REFERENCE TO RELATED APPLICATIONS

This application claims priority, under 35 U.S.C. §119(e), of Provisional Application No. 60/608,394, filed Sep. 8, 2004.

STATEMENT REGARDING FEDERALLY SPONSORED RESEARCH OR DEVELOPMENT

Not applicable.

BACKGROUND OF THE INVENTION

This invention is in the field of data communications, and is more specifically directed to optimization of discrete multitone modulation communications by selection of an optimum communications mode.

Digital Subscriber Line (DSL) technology has become one of the primary technologies in the deployment of high-speed Internet access in the United States and around the world. As is well known in the art, DSL communications are carried out between a central office (CO) location, operated by a telephone company or an Internet service provider, and individual subscribers, using existing telephone "wire" facilities. Typically, some if not all of the length of the loop between the CO and the customer premises equipment (CPE) is implemented by conventional twisted-pair copper telephone wire. Remarkably, modern DSL technology is able to carry out extremely high data rate communications, even over reasonably long lengths (e.g., on the order of 15,000 feet) of twisted-pair wire, and without interfering with conventional voice-band telephone communications.

Modern DSL communications achieve these high data rates through the use of multicarrier modulation (MCM) techniques, also referred to as discrete multitone modulation (DMT), by way of which the data signals are modulated onto frequencies in a relatively wide frequency band that resides well above the telephone voice band, and that is subdivided into many subchannels. The data symbols modulated onto each subchannel are encoded as points in a complex plane, according to a quadrature amplitude modulation (QAM) constellation. The number of bits per symbol for each subchannel (i.e., the "bit loading"), and thus the number of points in its QAM constellation, is determined according to the signal-to-noise ratio (SNR) at the subchannel frequency, which depends on the transmission channel noise and the signal attenuation at that frequency. For example, relatively noise-free and low attenuation subchannels may communicate data in ten-bit to fifteen-bit symbols, represented by a relatively dense QAM constellation with short distances between points in the constellation. On the other hand, noisy channels may be limited to only two or three bits per symbol, allowing a greater distance between adjacent points in the QAM constellation. High data rates are attained by assigning more bits (i.e., a more dense QAM constellation) to subchannels that have low noise levels and low signal attenuation, while subchannels with poorer SNRs can be loaded with a fewer number of bits, or none at all.

The most popular class of DSL communications protocols are referred to generically as asymmetric DSL ("ADSL"). Under ADSL, in this generic sense, frequency-division duplexing (FDD) carries out "downstream" communications from the telephone company central office ("CO") to customer premises equipment ("CPE") in one frequency band of the spectrum, and carries out "upstream" communications from the CPE to the CO in another, non-overlapping, frequency band. The asymmetry of asymmetric DSL refers to the assignment of a wider and higher-frequency band to downstream communications, and a narrower, lower-frequency, band to upstream communications. As a result, according to these technologies, the downstream data rate is typically much greater than the upstream data rate, except in those cases in which the loop length is so long that the downstream frequency band is mostly unusable.

Various DSL standards have been adopted in recent years. For example, ADSL under the so-called G.lite standard described in *Splitterless Asymmetric Digital Subscriber Line (ADSL) Transceivers*, ITU-T Recommendation G.992.2 (International Telecommunications Union, 1999) utilizes thirty-two upstream subchannels and 128 downstream subchannels, each subchannel having a bandwidth of 4.3125 kHz. As such, the bandwidth utilized under G.lite ADSL extends up to about 552 kHz. Newer DSL technologies provide higher data rates by variations of the DMT scheme of ADSL. DSL service according to the well-known "ADSL" standard (used in a specific sense relative to the standard *Asymmetric digital subscriber line transceivers (ADSL)*, ITU-T Recommendation G.992.1 (International Telecommunications Union, June 1999)), presently dominates much of the commercial DSL service in the United States, and utilizes thirty-two upstream subchannels and 256 downstream subchannels, extending the bandwidth to 1.104 MHz. The "ADSL2" standard increases the available data rate relative to the ADSL standard, but without increasing the number of subchannels and bandwidth; the performance improvements are attained under ADSL2 by way of improved modulation efficiency, reduced framing overhead, higher coding gain, an improved initialization procedure, and enhanced signal processing algorithms. The ADSL2 standard is described in *Asymmetric digital subscriber line transceivers 2 (ADSL2)*, ITU-T Recommendation G.992.3 (International Telecommunications Union, July 2002). Under the relatively new "ADSL2+" standard, the downstream data bandwidth is extended to 2.2 MHz using 512 subchannels of 4.3125 kHz., as described in *Asymmetric Digital Subscriber Line (ADSL) transceivers—Extended bandwidth ADSL2 (ADSL2+)*, Recommendation G.992.5 (International Telecommunications Union, May 2003). And additional DSL standards are also known in the art, including such protocols as very high bit-rate DSL ("VDSL"), which provides extremely high data rates via up to 4096 subchannels, at frequencies extending up to 30 MHz.

These multiple standards have each encountered substantial deployment in the field, with service providers and clients each tending toward higher data capacity where economically feasible. However, it is economically efficient for equipment manufacturers to manufacture and market equipment that can operate according to multiple standards, to provide customers with the flexibility of deployment and to reduce inventory pressures. As such, so-called multi-mode DSL transceiver equipment, capable of carrying out DSL communications according to any one of a number of standards, are known in the art.

By way of further background, so-called "automode" DSL transceiver equipment for deployment at central office (CO) or service area interface (SAI) locations in DSL communications networks are known. According to this automode approach, the CO transceiver effects initialization sequences with a client premises equipment (CPE) transceiver according to each of multiple DSL standards, measuring the actual data rate under each standard, and then selects the communications standard, or mode, that provided the highest data rate for that subscriber and loop. This approach obviously requires long training times in establishing a communications session (which, when multiplied by the number of sessions to be supported, results in substantial overhead), and also requires investment at the CO or SAI in order to support such automode.

BRIEF SUMMARY OF THE INVENTION

It is therefore an object of this invention to provide a receiver-side, or client side, system and method that is capable of optimizing digital communications according to a selected one of multiple communications standards.

It is a further object of this invention to provide such a system and method that enables operation according to a "lower" standard than under which the transmitter is operating, to obtain higher performance.

It is a further object of this invention to provide such a system and method that obtains such higher performance in a manner that is transparent to the other transceiver in the subscriber loop.

It is a further object of this invention to provide such a system and method that attains these benefits without substantial increases in initialization or training time and overhead.

Other objects and advantages of this invention will be apparent to those of ordinary skill in the art having reference to the following specification together with its drawings.

The present invention may be implemented into a digital transceiver, such as may be deployed at client premises in a digital subscriber line (DSL) communications environment. During the initialization of a communications session according to a relatively high data rate standard, the client premises transceiver determines whether a lower data rate standard could actually improve data rate performance, for example because of the availability of more complex algorithms and computational bandwidth at the lower data rate. If so, the client premises transceiver configures itself to receive payload and control message data according to the higher standard, while processing the payload data according to the lower data rate standard but processing the control messages according to the higher data rate standard. Accordingly, higher data rate performance is attained in a manner that is transparent to the transmitter.

According to another aspect of this invention, the client premises transceiver is constructed to issue a "blackout" signal to the transmitter, in response to which the transmitter blocks the transmission of high frequency subchannels, further improving the data rate as received and processed at the receiver.

DETAILED DESCRIPTION OF THE INVENTION

The present invention will be described in connection with its preferred embodiment, namely as implemented into client premises equipment (CPE) for communications according to digital subscriber line (DSL) standards. However, it is contemplated that this invention may also provide important benefits in other applications, particularly those in which multiple standards or modes may be available. Accordingly, it is to be understood that the following description is provided by way of example only, and is not intended to limit the true scope of this invention as claimed.

Figure 1:
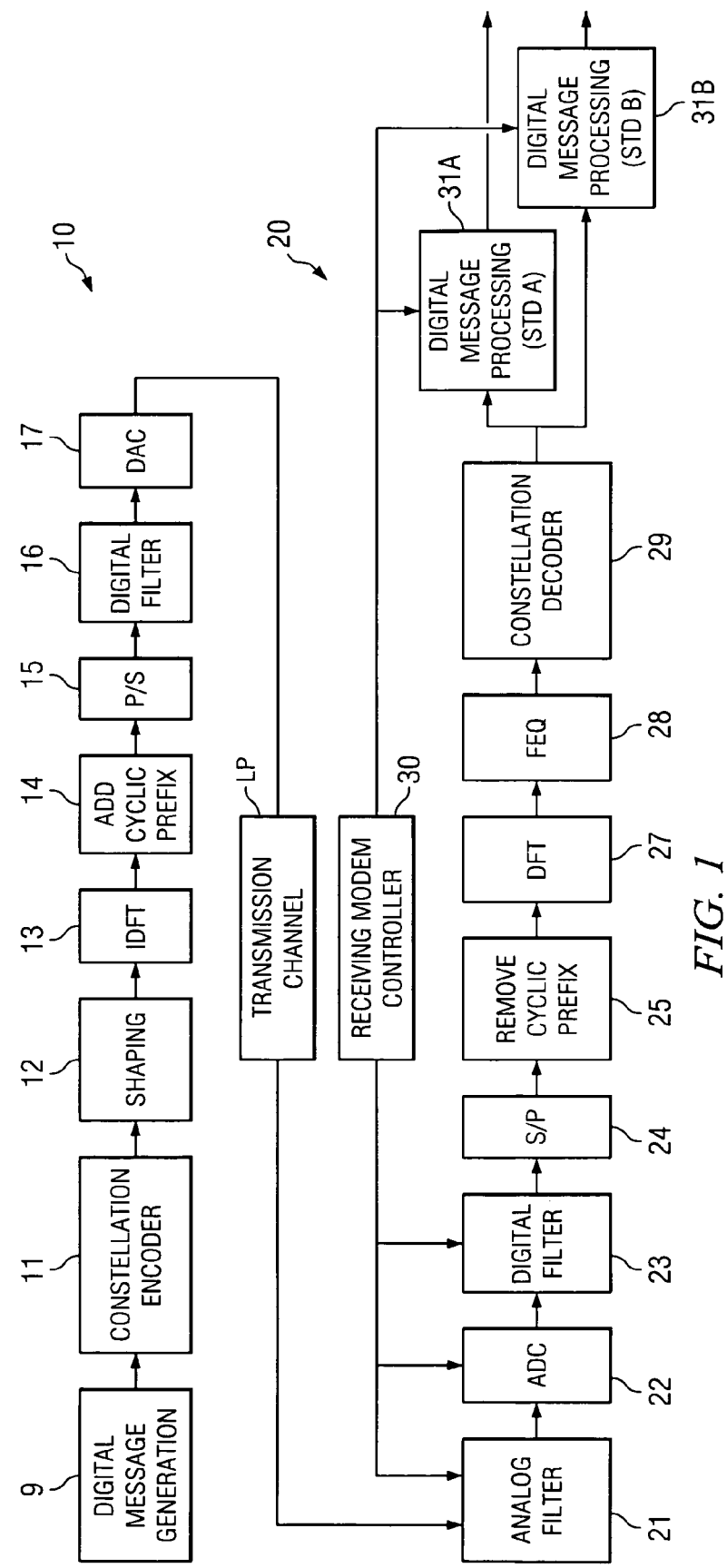
FIG. 1 is a data flow diagram, in block form, illustrating digital subscriber line (DSL) communications functions at a transmitter and a receiver according to the preferred embodiment of the invention.

FIG. 1 illustrates the data flow in DSL communications according to the preferred embodiment of the invention, for the downstream direction from a central office "CO" to customer premises equipment "CPE". As known in the art, many newer infrastructure implementations utilize fiber optic transmission from the true CO to a service area interface ("SAI") that is located in a neighborhood of subscribers. Within the SAI, an optical network unit ("ONU") includes a DSL transceiver, and services as a "CO" for DSL transmissions to and from the CPE from the SAI location. For purposes of this description, for the sake of clarity, the designation "CO" will refer both to a true "central office" location from which a DSL modem drives communications to, and receives DSL communications from, CPE over relatively long twisted-pair wire facilities, and also to a DSL modem deployed at an SAI in a neighborhood or building installation. In any case, each DSL transceiver (i.e., both at the CO and also in the CPE) typically includes both a transmitter and a receiver, so that data is also communicated in the opposite (e.g., upstream) direction over transmission channel LP according to a similar DMT process.

For purposes of this description, "downstream" communications will be described in detail, and as such, according to the preferred embodiment of the invention, transmitting modem 10 corresponds to a DSL modem deployed at the CO, while receiving modem 20 corresponds to the DSL modem within the CPE. And, for purposes of this description, transmitting modem 10 is arranged to transmit DSL communications according to a high data rate DSL standard, for example the ADSL2+ standard described in *Asymmetric Digital Subscriber Line (ADSL) transceivers—Extended bandwidth ADSL2 (ADSL2+)*, Recommendation G.992.5 (International Telecommunications Union, May 2003). Transmitting modem 10 initializes a DSL session with receiving modem 20 at the CPE according to this standard, and issues control messages to receiving modem 20 also according to this standard. Referring to FIG. 1, digital message generation function 9 of transmitting modem 10 includes digital message generation function 9, which arranges the payload data to be transmitted, and also the control messages to be transmitted under the corresponding standard (ADSL2+ in this example).

The output of digital message generation function 9, typically in the form of a serial stream of binary digits, is applied to constellation encoder 11. Constellation encoder 11 fundamentally groups the bits in the input bitstream into multiple-bit symbols that are used to modulate the discrete multitone modulation (DMT) subchannels, with the number of bits in each symbol determined according to the bit loading assigned to its corresponding subchannel, based on the characteristics of the transmission channel, as known in the art. Encoder 11 may also include other encoding functions, such as Reed-Solomon or other forward error correction coding, trellis coding, and the like. The symbols generated by constellation encoder 11 correspond to points in the appropriate modulation constellation (e.g., QAM), with each symbol associated with one of the DMT subchannels. Following constellation encoder 11, shaping function 12 applies gains to each of the DMT subchannels to ensure compliance with the appropriate power spectrum density (PSD), to apply power cutback as determined according to the operative standard, and to apply other gain control such as a clip prevention signal to reduce the peak-to-average ratio (PAR) of the transmitted signal.

The encoded and gain-shaped symbols are applied to inverse Discrete Fourier Transform (IDFT) function 13, which associates each symbol with one subchannel in the transmission frequency band, and generates a corresponding number of time domain symbol samples according to the Fourier transform. As known in the art, cyclic insertion function 14 appends a cyclic affix to the modulated time-domain samples from IDFT function 13, and perform transmitter windowing, and presents the extended block of serial samples to parallel-to-serial converter 15. Following conversion of the time-domain signal into a serial sequence by converter 15, and such upsampling (not shown) as appropriate, digital filter function 16 then processes the digital datastream in the conventional manner to remove image components and voice band or ISDN interference. The filtered digital datastream signal is then converted into the analog domain by digital-to-analog converter 17. After conventional analog filtering and amplification (not shown), the resulting DMT signal is transmitted over a channel LP, over some length of conventional twisted-pair wires, to receiving CPE modem 20, which, in general, reverses the processes performed by the transmitting modem to recover the input bitstream as the transmitted communication.

At receiving CPE modem 20, which in this example is located at a client premises, analog filters 21 apply the appropriate signal filtering to the received signal, followed by analog-to-digital conversion 22 converts the filtered analog signal into the digital domain. Digital filtering function 23 is then applied to augment the function of analog filters 21. A time domain equalizer (TEQ) (not shown in FIG. 1) may apply a finite impulse response (FIR) digital filter that effectively shortens the length of the impulse response of the transmission channel LP. Serial-to-parallel converter 24 converts the datastream into a number of samples (2N) for application to Discrete Fourier Transform (DFT) function 27, after removal of the cyclic extension from each received block in function 25. At DFT function 27, the modulating symbols at each of the subchannel frequencies are recovered by reversing the IDFT performed by function 12 in transmission. The output of DFT function 27 is a frequency domain representation of the transmitted symbols multiplied by the frequency-domain response of the effective transmission channel. Frequency-domain equalization (FEQ) function 28 divides out the frequency-domain response of the effective channel, recovering the modulating symbols. Constellation decoder function 29 then resequences the symbols into a serial bitstream, decoding any encoding that was applied in the transmission of the signal and producing an output bitstream that corresponds to the input bitstream upon which the transmission was based.

According to this preferred embodiment, and as will become more apparent from the following description, receiving modem 20 is capable of processing digital communications according to multiple standards. More specifically, as will be described in detail below, it is contemplated that receiving modem 20 may operate to process digital payload according to a lower data rate standard, and to process digital messages corresponding to control information according to a higher data rate standard. In this manner, transmitting DSL modem 10 can transmit its signals (payload and control) according to a higher data rate standard, but over a subset of the total available subchannels selected during initialization, with receiving modem 20 operating to attain the best performance by processing the payload according to a lower data rate standard. This is illustrated in FIG. 1, by receiving modem 20 applying digital message processing function 31A and digital message processing function 31B to the decoded output of constellation decoder 29; functions 31A and 31B operate according to two different standards (A and B as shown in FIG. 1). This operation will be described in further detail below.

To this end, receiving modem 20 includes receiving modem controller 30, which consists of the appropriate logic for determining the particular standard or mode according to which the various blocks of the received signal are to be processed. As such, controller 30 controls the operation of message processing functions 31A, 31B. In addition, as will be described in further detail, according to the preferred embodiment of the invention, receiving modem controller 30 also can adjust the characteristics of analog and digital filter functions 21, 23, and the sampling rate applied by ADC 22, according to the desired mode of operation.

As known in the art, receiving modem 20 at the client premises also includes the capability of transmitting upstream DSL communications to the central office. This upstream transmission is carried out according to a similar encoding and modulation process as illustrated in FIG. 1 for transmitting modem 10, but of course with the signals traveling in the opposite direction through transmission channel LP and, according to conventional ADSL standards, at different subchannel frequencies from the downstream communications. It is contemplated that those skilled in the art will be readily able to realize such upstream communications in connection with this invention.

Figure 2:
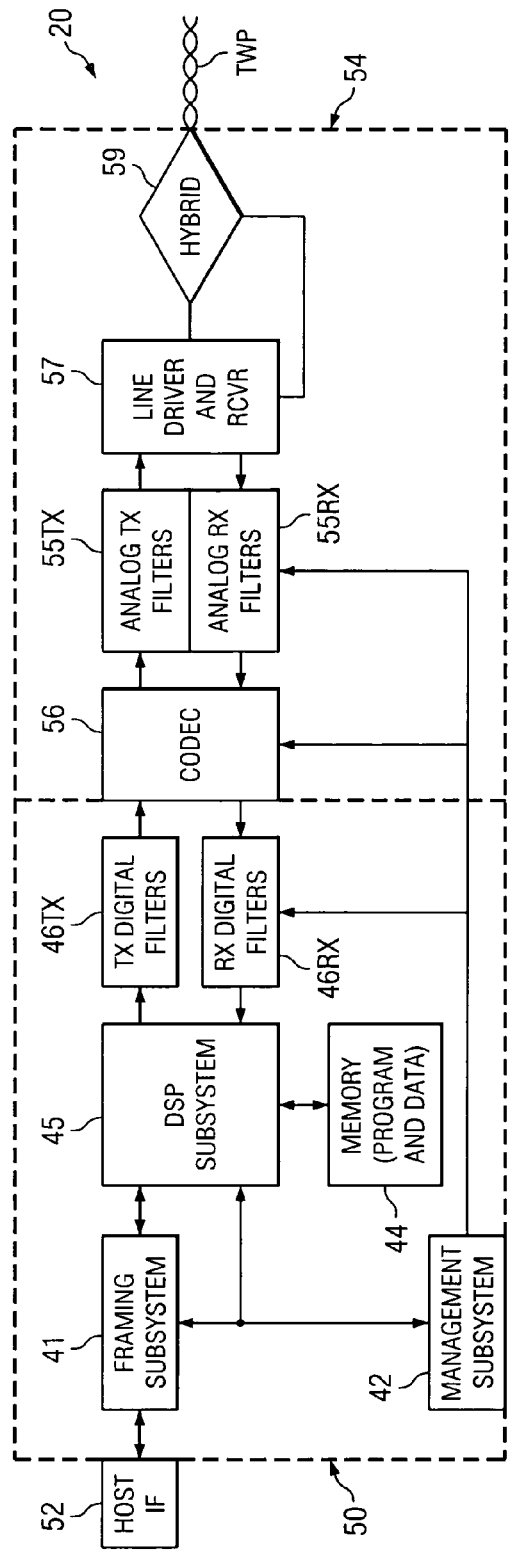
FIG. 2 is an electrical diagram, in block form, illustrating the architecture of a digital transceiver according to the preferred embodiment of the invention.

FIG. 2 illustrates an exemplary architecture of CPE modem 20 (corresponding to receiving modem 20 of FIG. 1), as may be deployed as client premises equipment (CPE) according to this embodiment of the invention. The construction of CPE modem 20 shown in FIG. 2 is provided by way of example only, and is meant only to illustrate a possible modem architecture into which the preferred embodiment of the invention may be implemented. Of course, the invention may be implemented into DSL modems of different architectures, and into communications equipment of similar and different architectures for different communications applications.

CPE modem 20 is effectively a transceiver, in the sense that it can both transmit and receive signals over twisted pair facility TWP, which corresponds to transmission channel LP of FIG. 1. According to this preferred embodiment of the invention, CPE modem 20 includes digital transceiver 50, which is coupled to host interface 52 for communicating with the client side host computer, which is typically a personal computer that may be coupled to modem 20 via a router or other network adapter, for example. Considering that CPE modem 20 is intended as CPE, digital transceiver 50 in this example supports one communications port, such as shown in FIG. 2 in which digital transceiver 50 is connected to a single instance of analog front end 54, which in turn couples to twisted-pair wire facility TWP. Alternatively, digital transceiver 50 may support multiple communications ports, for example in a "bonded" DSL environment in which modem 20 receives downstream signals over two separate twisted pair facilities, in which case each port would be realized by an instance of analog front end 54. Analog front end 54 in this example includes hybrid circuit 59, which is a conventional circuit that is connected to transmission loop LP, and that converts the two-wire arrangement of the twisted-pair facility to dedicated transmit and receive lines connected to line driver and receiver 57, considering that bidirectional signals are communicated over facility TWP by CPE modem 20.

Line driver and receiver 57 is a high-speed line driver and receiver for driving and receiving ADSL signals over twisted-pair lines. Line driver and receiver 57 is bidirectionally coupled to coder/decoder ("codec") circuit 56 via analog transmit and receive filters 55TX, 55RX, respectively. Codec 56 in analog front end 54 performs the conventional analog codec operations on the signals being transmitted and received, respectively. These functions include digital and analog filtering, digital-to-analog conversion (transmit side), analog-to-digital conversion (receive side), attenuators, equalizers, and echo cancellation functionality, if desired. Examples of conventional devices suitable for use as analog front end 54 according to the preferred embodiment of the invention include conventional integrated analog front end devices, such as the TNETD7122 and 7123 integrated AFE circuits available from Texas Instruments Incorporated.

As shown in FIG. 2, digital transceiver 50 includes framing subsystem 41, which is coupled to the fiber optic side of transceiver 50, and which formats digital data to be transmitted into frames, or blocks, for modulation and transmission. DSP subsystem 45 of digital transceiver 50 is preferably one or more digital signal processor (DSP) cores, having sufficient computational capacity and complexity to perform much of the digital processing in the encoding and modulation (and demodulation and decoding) of the signals communicated via digital transceiver 50. Transceiver 50 also includes memory resources 44, including both program and data memory, accessible by DSP subsystem 45 in carrying out its digital functions, for example according to software stored in memory resources 44. These digital functions includes the IDFT modulation (and DFT demodulation of received signals), appending (and removal) of cyclic extensions, among other conventional digital functions.

As shown in FIG. 2, digital transceiver 50 also includes transmit and receive digital filters 46TX, 46RX, respectively, for applying the appropriate filter functions to the transmitted and received signals, respectively. Digital filters 46TX, 46RX may be executed by DSP subsystem 45 according to the corresponding software routines, as known in the art, or alternatively may be realized as separate hardware resources. Management subsystem 42 implements and effects various control functions within digital transceiver 50, communicating with each of the major functions of digital transceiver 50 to control its operation according to the desired number of ports to be supported. In addition, as shown in FIG. 2, management subsystem 42 issues control lines to receive digital filters 46RX, to receive analog filter 55RX, and to codec 56. As will become apparent in connection with the preferred embodiment of the invention described below, management subsystem 42 can adjust these receive filters and the sampling rate applied by codec 56 to attain improved data rate performance, depending on the particular conditions of the channel.

As mentioned above, the architecture shown in FIG. 2 is presented by way of example only. Alternative architectures for DSL modem communication, and for other multicarrier modulation communication systems such as OFDM wireless communications, are also contemplated to be within the scope of the invention, and may be implemented by those skilled in the art having reference to this specification, without undue experimentation.

Figure 3:
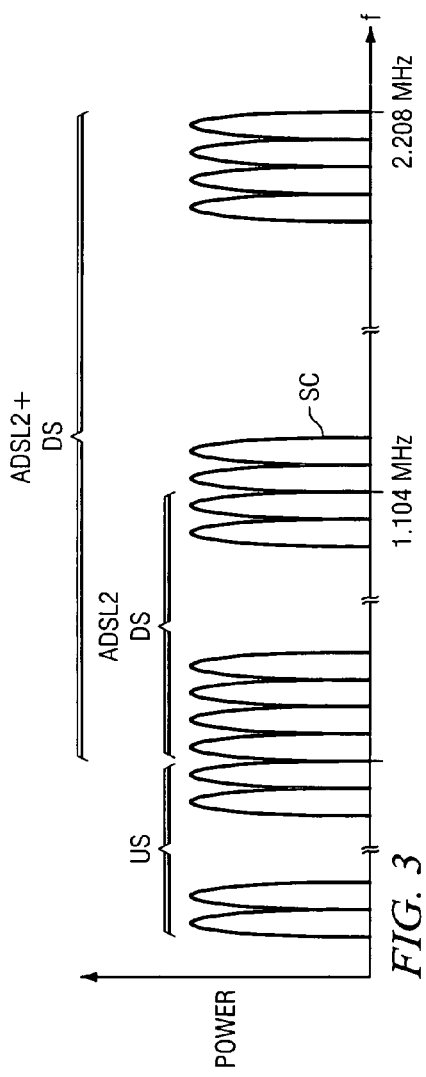
FIG. 3 is a plot illustrating the bandwidth utilized by two DSL standards, according to which the transceiver of the preferred embodiment of the invention operates.

As known in the art and as discussed above, the various DSL standards, both currently and as contemplated in the future, involve significant variations with respect to one another, for various parameters and facets. By way of example, differences between the well-known ADSL2 standard (described in *Asymmetric digital subscriber line transceivers 2 (ADSL2)*, ITU-T Recommendation G.992.3 (International Telecommunications Union, July 2002), incorporated herein by this reference) and the well-known ADSL2+ standard (described in *Asymmetric Digital Subscriber Line (ADSL) transceivers—Extended bandwidth ADSL2 (ADSL2+)*, Recommendation G.992.5 (International Telecommunications Union, May 2003), also incorporated herein by this reference) include differences in the available downstream bandwidth, and number of downstream subchannels, and also differences in the various initialization and control message formats and sequences. FIG. 3 illustrates the relative bandwidths of the ADSL2 and ADSL2+ standards.

As shown in FIG. 3, multiple subchannels SC are located at varying frequencies throughout the entire bandwidth, each subchannel having a bandwidth of 4.3125 kHz as known in the art. According to both of the ADSL2 and ADSL2+ standards, thirty-two (in some environments, sixty-four) upstream subchannels SC are defined, and reside at the lower region of the ADSL2/2+ spectrum (e.g., beginning with the upper voice band frequency). According to the ADSL2 standard, up to as many as 256 subchannels SC are then assigned to downstream communications, extending to an upper frequency limit of 1.104 MHz. Under ADSL2+, however, additional data capacity is provided by extension of the number of subchannels SC up to 512 subchannels for downstream communications, extending the bandwidth up to 2.208 MHz. Accordingly, assuming reasonable channel performance over the entire bandwidth, the downstream data rate for communications under the ADSL2+ standard is theoretically much higher than that under the ADSL2 standard.

It has been observed, in connection with this invention, that higher data rate performance at receiving modem 20 is not necessarily attained under the ADSL2+ standard, even if some of subchannels 32 above the 1.108 MHz ADSL2 limit carry payload data. The improved ADSL2 data capacity can result from digital message processing operations carried out at receiving modem 20. Much of this improvement follows from the ability to use a lower sampling rate (e.g., at 2.208 MHz, for the maximum subchannel frequency of 1.104 MHz under ADSL2), relative to the sampling rate of the higher data rate standard (e.g., 4.416 MHz for a maximum subchannel frequency of 2.208 MHz under ADSL2+). For example, it is contemplated that more complex digital signal processing routines, such routines resulting in improved decoding and more faithful data recovery, can be carried out at a lower sampling rate; this improved signal processing may be able to recover sufficient data (and thus permit higher bit loading) to improve the overall performance beyond that attainable by less complex processing at a faster sample rate, despite some bit loading into the higher standard. In addition, an interferer at a frequency above the lower standard (ADSL2) top frequency but below the higher standard (ADSL2+) top frequency may cause sufficient noise throughout the bandwidth to substantially impact multiple subchannels; however, such an interferer may be filterable out of the signal if a lower standard is used.

As mentioned above, in connection with the background of this invention, these possibilities may be dealt with by "automode" processing effected by the central office (or SAI) modem, specifically by measuring the data rate at each of two to several ADSL standard modes during the initialization of a communications session, and then selecting the standard or mode that provides the best overall performance. However, it has been observed, according to this invention, that many CO and SAI DSL modems are now being deployed that have only one, high-speed, downstream transmission mode. Specifically, CO and SAI modems are now often deployed with only a single, high data-rate, mode of operation. For example, CO/SAI modems that support only ADSL2+ data communications are now often implemented. Not only do such modems transmit data over the entire applicable ADSL2+ bandwidth, but such modems are also capable of initializing a session according only to this single standard mode.

According to the preferred embodiment of the invention, CPE modems are provided that estimate the data rates available under multiple DSL standards or operating mode, and that can operate at least in part to attain higher data rate performance under a lesser mode (when available), without requiring the CO or SAI DSL modem to itself change to the lower data rate mode. Indeed, according to the preferred embodiment of the invention, the CO or SAI DSL modem is preferably not aware that the client modem with which it is communicating utilizes the higher data rate standard.

Figure 4:
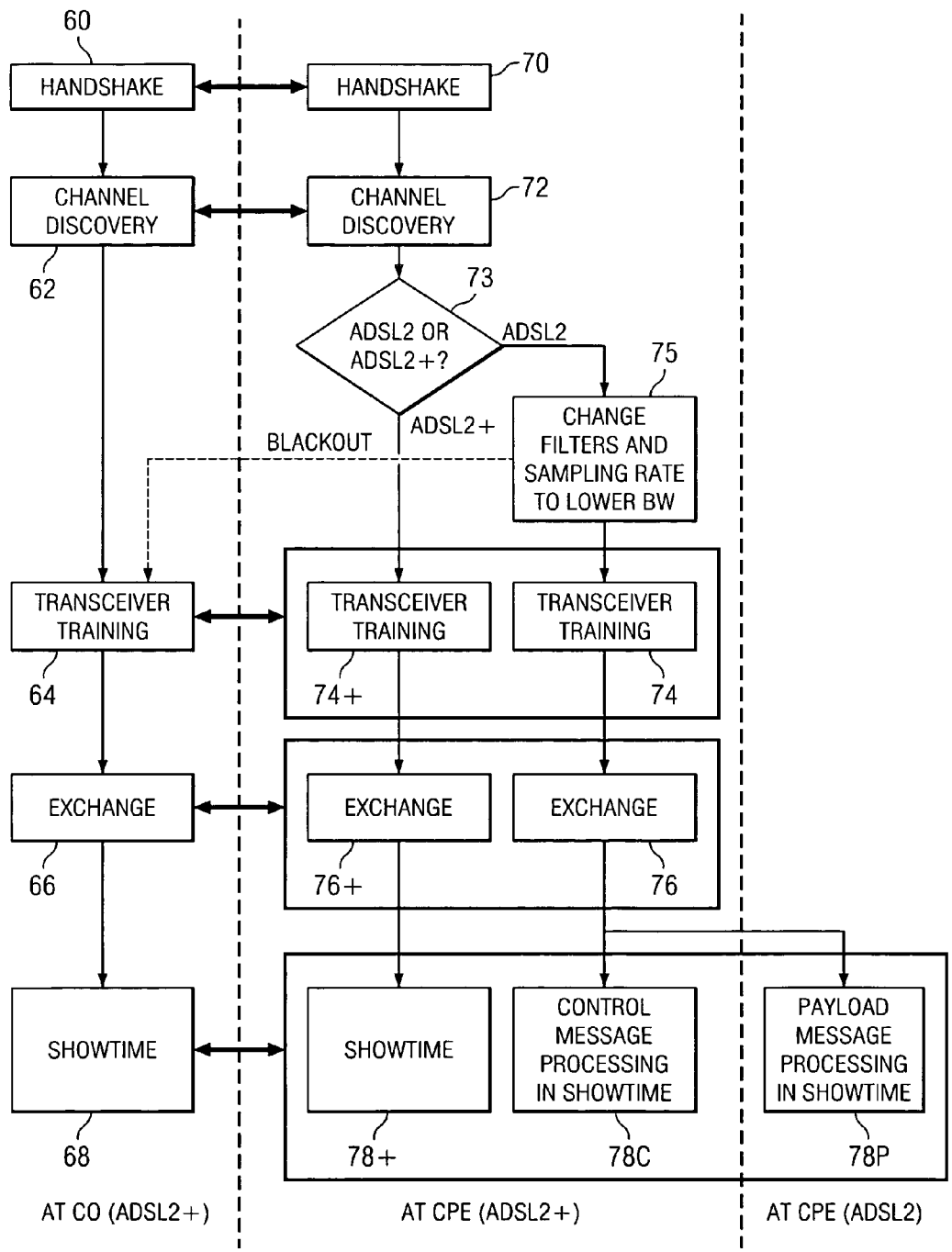
FIG. 4 is a flow chart illustrating initialization of a DSL communications session according to the preferred embodiment of the invention.

Referring now to FIG. 4, the operation of CPE modem 20 in combination with a central office modem in establishing and carrying out DSL communications according to the preferred embodiment of the invention. These processes will be described with reference to conventional ADSL standards, for example *Asymmetric digital subscriber line transceivers 2* (*ADSL2*), ITU-T Recommendation G.992.3 (International Telecommunications Union, July 2002); *Asymmetric Digital Subscriber Line (ADSL) transceivers—Extended bandwidth ADSL2 (ADSL2+)*, Recommendation G.992.5 (International Telecommunications Union, May 2003), incorporated herein by this reference. It will be understood by those skilled in the art having reference to this specification that this invention may also be readily applied to communications protocols that utilize different approaches to establishing a communications session.

Figure 5:
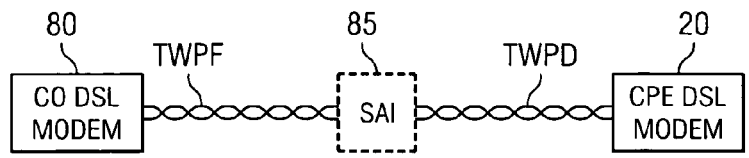
FIG. 5 is an electrical diagram, in block form, of a DSL communications system illustrating the relationship between the central office and client premises equipment, according to the preferred embodiment of the invention.

By way of reference, CPE modem 20 will be communicating with central office (CO) modem 80 in a subscriber loop communications arrangement as illustrated, generically, in FIG. 5. In this case, as typical in the art, the DSL communications will be carried over twisted pair wire facilities TWPF and TWPD, via a service area interface (SAI) 85 serving as a passive cross-connect; alternatively, as known in the art, modem 80 may be realized with SAI 85 itself, with communications between the central office and SAI 85 carried over a fiber optic or other high data-rate facility; in this case, the DSL communications established and carried out in connection with this preferred embodiment of the invention will only be carried over distribution twisted-pair wire facility TWPD. Of course, other clients will typically also be served by SAI 85, as known in the art.

Referring back to FIG. 4, initialization of a DSL session begins with the handshaking phase of initialization. In this example, CO modem 80 performs handshake process 60 in cooperative combination with CPE modem 20 executing handshake process 70. As known in the art, the handshaking phase of initialization involves the requesting of a communications session by one of the modems (typically CPE modem 20) over twisted-pair facility TWPF, TWPD, and the exchange of capabilities of the respective modems 20, 80 with one another over this facility.

Following the handshake phase, CO modem 80 executes process 62 in cooperation with CPE modem 20 executing process 72, to effect the channel discovery phase of initialization. As is well known in the art, channel discovery process 62 involves CO modem 80 issuing a sparsely populated periodic wideband signal of known content and power to CPE modem 20, which in turn analyzes the signal as received, to determine the conditions of each of the subchannels in the bandwidth. It is contemplated that programmable circuitry within CPE modem 20, for example DSP subsystem 45 within digital transceiver 30 in the exemplary architecture of FIG. 2, execute channel discovery process 72 to analyze the received signals over the bandwidth.

As discussed above, CPE modem 20 has the capability of selecting among multiple ADSL standards to attain the highest data rate, according to the preferred embodiment of the invention. It is preferred that this selection be performed in a manner that is transparent to CO modem 80; indeed, it is contemplated that this selection among ADSL standards may be effected in such cases in which CO modem 80 is capable of operating only according to a single, high-data-rate, standard. As such, channel discovery processes 62, 72 are carried out according to the highest data rate standard under consideration. For example, if CO modem 80 is capable only of communicating under the ADSL2+ standard, while CPE modem 20 can select between the ADSL2 and ADSL2+ standards, channel discovery processes 62, 72 will analyze all of the subchannels under the higher bandwidth ADSL2+ standard, i.e., the 512 subchannels extending up to 2.208 MHz. And because the subchannels under analysis in processes 62, 72 extend up to 2.208 MHz, CPE modem 20 thus performs its processes 70, 72 using its highest frequency capability, including a sample clock frequency in its codec 56 (FIG. 2) of at least twice the highest useful frequency (i.e., sampling at 4.416 MHz), and having its analog and digital receive filters 55, 46RX with cutoff frequencies sufficiently high to pass data signals at the highest usable subchannel frequency. This operation according to the higher data-rate standard (e.g., ADSL2+) is illustrated in FIG. 5 by the line separating ADSL2+ from ADSL2 operation on the CPE side.

As a result of channel discovery process 72, CPE modem 20 next executes decision 73 to determine which of the available ADSL standards (ADSL2 and ADSL2+ in this example) will provide the best data rate performance. As discussed above, many modern DSL modems have the capability of performing relatively complex digital signal processing routines on received signals, given sufficient time and resources to carry out such processing; this complex digital signal processing can have the benefit of providing an effective data rate that is higher than when more rudimentary signal processing is involved. One example of such processing involves the decoding of received points in a QAM constellation; highly complex signal processing algorithms are available that can reduce the noise sensitivity of the decoding, which in turn enables a denser QAM constellation to be used at the transmitter (i.e., increasing the "bit loading" on the subchannels). However, given a limited computational throughput of realistic logic such as DSP subsystem 45, this complex signal processing may be available only if the data throughput requirements are sufficiently low that adequate processing time is available; in other words, the signal processing available under a lower data rate standard (e.g., ADSL2) may not be available under the higher data rate standard (e.g., ADSL2+). As a result, because of the availability of more complex signal processing, the lower theoretical data rate standard may actually result in a higher effective data rate (after processing) than the higher theoretical data rate standard.

Figure 6A:
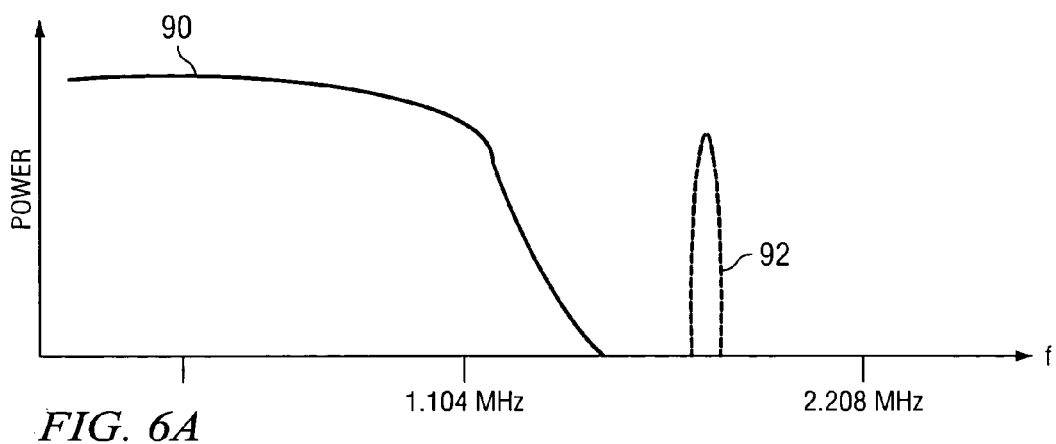
FIGS. 6a and 6b are plots illustrating the power over frequency of an exemplary transmitted signal and the effects of optimization of the receiving modem according to the preferred embodiment of the invention.

FIG. 6a illustrates situations in which the lower theoretical data rate standard, applied at a receiving modem such as CPE modem 20, may result in better performance. In FIG. 6a, curve 90 illustrates an example of received signal power at CPE modem 20 over frequency for a signal transmitted from CO modem 80. As evident from FIG. 6a, the received signal power drops off rapidly after the ADSL2 upper threshold of 1.104 MHz; such behavior can occur at long loop lengths, due to the increased attenuation with frequency as such loop lengths. In an example such as this, the additional data capacity that would be received at frequencies above 1.104 MHz, because of the relatively light bit loading that would be applied to those subchannels, may not outweigh the improvement in digital processing that could be applied to the signals received on the lower frequency subchannels (which would, of course, increase the bit loading on those subchannels) if the sample rate could be reduced.

FIG. 6a also illustrates another situation that could result in the lower data rate standard becoming more attractive. Curve 92 illustrates the power of an interferer, or noise source, present at a frequency between the ADSL2 limit of 1.104 MHz and the ADSL2+ limit of 2.208 MHz. In this case, sampling by CPE modem 20 at a rate of 4.416 MHz or higher (the Nyquist frequency for ADSL2+ operation), and the setting of filter characteristics to pass frequencies up to 2.208 MHz, would necessarily result in that noise appearing in the received signal. While the presence of this interferer would result in zero data bits being loaded on the corresponding subchannels during initialization (or set to "blackout" under ADSL2+, if available), the effects of that noise being sampled would necessarily bleed over into other payload-bearing subchannels. In this event, the effects of this interferer (in addition to such high frequency signal attenuation as evidenced by curve 90 of FIG. 6a) may be sufficient that receipt of signals under the lower theoretical data rate standard (ADSL2) would provide higher data capacity than the higher data rate standard.

Referring back to FIG. 4, as mentioned above, CPE modem 20 executes decision 73 to determine whether receipt of data signals under the lower data rate ADSL standard (e.g., ADSL2) would provide better performance than the higher data rate standard (e.g., ADSL2+, in this example). Preferably this decision 73 is based upon an estimate of the potential data rates rather than measurement of actual achievable data rates, considering that initialization only under one standard is being carried out (indeed CO modem 80 often may only operate under the higher data rate standard), and in order to minimize training time. As such, decision 73 may depend on certain programmed parameters that are defined in characterization of CPE modem 20 itself, so that the execution of decision 73 by CPE modem 20 in practice may be quite simple, and based on the measurements of downstream channel characteristics that are directly available from the channel discovery phase of initialization. Of course, the relative abilities of digital signal processing for each of the available standards will be important in this determination. By way of example, DSP subsystem 45 in CPE modem 20 may perform decision 73 by summing the measured channel characteristics for channels above the 1.104 MHz limit and then select the better standard based on whether this sum (e.g., corresponding to a positive measure of data carrying capability) is above or below a programmed threshold. It is contemplated that those skilled in the art having reference to this specification will be readily able to realize decision 73 within a particular implementation, to such a degree of accuracy in the estimation of the respective data rates as desired.

If the estimated available data capacity under the higher theoretical data rate standard, as determined by CPE modem 20 in channel discovery process 72, outweighs the benefit of the lower standard signal processing, the higher data rate standard is selected (e.g., decision 73 returns ADSL2+ in the example of FIG. 4). In this preferred embodiment of the invention, CPE modem 20 and CO modem 80 carry out the remaining phases of initialization under the higher data rate standard (ADSL2+ in this example). As shown in FIG. 4, these ADSL2+ initialization processes include transceiver training process 64 for CO modem 80 in cooperation with transceiver training process 74+ for CPE modem 20, and exchange process 66 for CO modem 80 in cooperation with exchange process 76+ for CPE modem 20. As known in the art, transceiver training processes 66, 76+ involve the transmission of a periodic wideband signals over the facility (extending, in this case, over the full ADSL2+ bandwidth), followed by modems 20, 80 executing their respective training algorithms in the conventional manner. Exchange processes 66, 76+ involve the transmission of aperiodic wide band signals between modems 20, 80, by way of which communications parameters are exchanged. Upon completion of the initialization or training under the higher data rate standard, CO modem 80 and CPE modem 20 commence communications of actual data, in "showtime" processes 68, 78+, respectively.

As known in the art, the showtime phase of DSL communications involves the communication of payload data, in both the upstream and downstream directions, and also the communication of control and status information. Referring back to FIG. 1, under the higher data rate standard (ADSL2+ in this example), downstream data and control messages are all processed, at receiving CPE modem 20, by digital message processing function 31A, for example. And, referring to FIG. 1, filter functions 21, 23 and ADC function 22 (codec 36) are controlled by controller 30 to operate in a manner consistent with the higher data rate standard, sampling at the appropriate high Nyquist frequency and applying filter characteristics to pass the higher frequencies. In the hardware context of FIG. 2, management subsystem 42 controls receive filters 55RX and 46RX, and codec 36, consistently with the higher data rate standard. DSL communications are thus carried out for the duration of the session.

On the other hand, if CPE modem 20 determines that the lower data rate standard will provide better data rate performance in the receipt of downstream communications (decision 73 returns ADSL2, in the example of FIG. 4), CPE modem 20 then configures itself in that manner. According to this example of the preferred embodiment of this invention, CPE modem 20 first executes process 75, by way of which its filters, sampling rate, and other operational parameters are configured according to the lower data rate standard.

In this example, where the lower data rate standard is ADSL2 and the higher data rate standard is ADSL2+, process 75 involves configuring CPE modem 20 to receive and process signals that have a top subchannel frequency of the ADSL2 limit, at 1.104 MHz. Accordingly, referring to FIG. 1, controller 30 applies the appropriate controls that the filter characteristics of analog filter function 21 and digital filter function 23 pass frequencies up to 1.104 MHz, and reject frequencies above that limit. In the hardware sense, referring to the example of FIG. 2, management subsystem 42 applies the corresponding control signals to receive filters 55RX and 46RX to set the characteristics accordingly. The specific manner in which the characteristics of these filters are configured will, of course, depend on the construction and operation of the filters themselves. For example, passive components may be switched into or out of analog receive filters 55RX, and feedback paths or taps may be switched in or out of digital receive filters 46TX. It is contemplated that those skilled in the art having reference to this specification will readily recognize the appropriate way in which these filters can be configured in process 75. In addition, process 75 also establishes the appropriate sampling frequency according to which ADC function 22 (in codec 36 of FIG. 3) samples the incoming filtered analog signal, and according to which the digital operations of the remainder of CPE modem 20 (digital transceiver 30) are applied to the digitized received signals. At a rudimentary level, in this example, the sampling frequency is changed in process 75 from 4.416 MHz (for ADSL2+) to 2.208 MHz (for ADSL2), according to the difference in Nyquist frequencies for the two standards.

It is contemplated that process 75 will preferably be carried out, at CPE modem 20, during the "quiet" frames following channel discovery, according to the ADSL2+ standard.

Figure 6B:
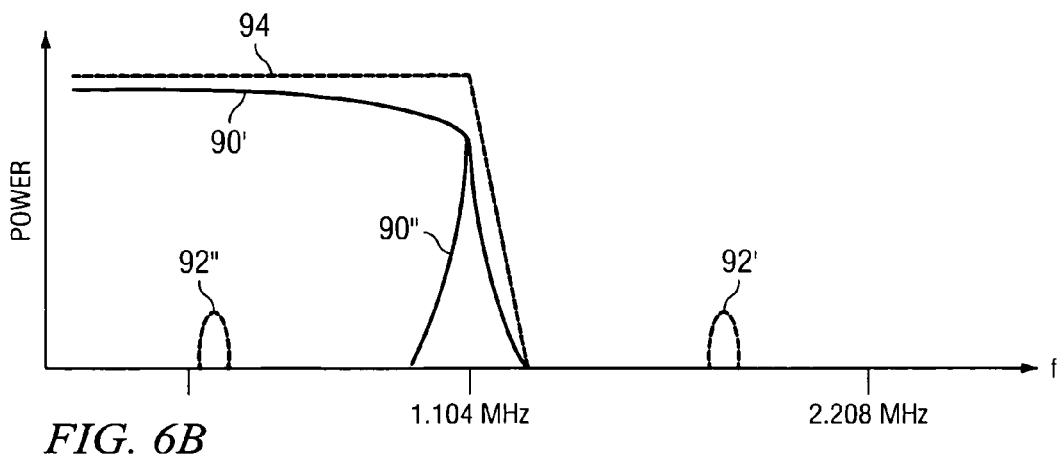

FIG. 6b illustrates the effect of process 75 on the energy received, for the example of FIG. 6a. In this example, curve 94 illustrates the combined filter characteristic of analog receive filters 55RX and digital receive filters 46TX after configuration for the lower data rate standard of ADSL2. This filter characteristic results in received signal curve 90' having reduced power at frequencies above 1.104 MHz, relative to the original power of FIG. 6a. The noise energy 92' in FIG. 6b is also much reduced from that of FIG. 6a, because of the operation of analog receive filter 55RX. Because of the reduction in sampling frequency to the Nyquist frequency of ADSL2 transmissions, the energy at frequencies above 1.104 MHz will tend to alias at frequencies below 1.104 MHz, as shown by aliased power curve 90" and aliased noise curve 92". However, it is contemplated that this aliasing energy will have minimum impact on the signal fidelity, in most cases. And, if desired, an estimate of the aliasing energy may be useful in carrying out decision 73, if practicable from a computational complexity standpoint.

According to an alternative embodiment of the invention, as shown in FIG. 4, CPE modem 20 may issue a "blackout" signal to CO modem 80 if decision 73 selects the lower data rate standard, and if the standard under which CO modem 80 is operating has the "blackout" feature enabled. Under ADSL2+, subchannels or sets of subchannels can be selectively blacked out, or not used, at the request of the CPE modem as a communications session is established. A subchannel that is "blacked out" will have no energy assigned to it (bit loading and gain will be zero). According to this alternative embodiment of the invention, CPE modem 20 issues a blackout signal to CO modem 80, upon the conclusion of channel discovery process 72 and decision 73, indicating that CO modem 80 should black out all subchannels above the ADSL2 upper frequency limit of 1.104 MHz. In effect, CO modem 80 will then operate according to the ADSL2+ standard, but only on a subset of subchannels. This blackout feature provides the additional benefit that no energy will be transmitted on the higher frequency subchannels, and as such there will be no aliasing of energy from this transmitted signal energy, as shown in FIG. 6b by aliasing curve 90'. As such, the signal fidelity under this blackout arrangement will be even further improved.

Following configuration process 75, CPE modem 20 continues with the remainder of the initialization processes, including transceiver training process 74, and exchange process 76. It is contemplated that these initialization processes will continue to be carried out under the higher data rate standard (e.g., ADSL2+), but of course with the parameters set and communicated according to the selected lower data rate standard. It is also contemplated that the information exchanged by CPE modem 20 in process 76 includes subchannel specific information, such as bit loading, that will take advantage of the higher complexity digital processing that CPE modem 20 intends to apply to the received payload data; it is this higher complexity processing, and higher bit loading, that provides the improved data rate performance assumed by CPE modem 20 in executing its decision 73, as described above. In addition, it is contemplated that those subchannels at the higher frequencies that will not be used, according to the lower data rate payload standard, will have their bit loading and gains reduced accordingly, as communicated by CPE modem 20 in exchange process 76.

At showtime, CO modem 80 continues to execute its process 68, transmitting downstream signals according to the higher data rate standard (e.g., ADSL2) but using the subchannels communicated to it by CPE mode 20 during this initialization. As such, control messages will be communicated to CPE modem 80 still according to the higher data rate standard (ADSL2+). These control messages will typically differ from corresponding control messages for the lower data rate standard (ADSL2), for example in the length of the control information that relates to each of the available subchannels. As such, CPE modem 20 parses and processes the control messages communicated by CO modem 80 during showtime according to the higher data rate standard, in process 78C. Referring to FIG. 1, this processing is carried out by digital message processing function 31A, according to the higher data rate standard.

CPE modem 20 includes digital message processing function 31B, however, according to which the payload data can be digitally processed according to the lower data rate standard; this processing (shown as process 78P in FIG. 4) preferably involves higher complexity digital processing in order to retrieve data from the higher density signals transmitted by CO modem 80. As such, controller 30 (FIG. 1) controls the routing of decoded data from decoder function 29 to the respective digital message processing functions 31A, 31B, according to whether the information is control information (to function 31A) or payload data (to function 31B). The output of digital message processing functions 31A, 31B amounts to various control and data information, which is routed to and processed by the host computer or other system element in the conventional manner.

Various alternatives are contemplated in connection with this invention. In the example described above, the CO modem is operable accordingly only to a single high data rate standard. It is also contemplated that this invention may be applied to a system in which the CO modem can operate according to multiple standards, such that the CPE modem can communicate its standard decision to the CO modem, with the CO modem then switching to the preferred standard. Further in the alternative, it is contemplated that the selection of communications mode according to this embodiment of the invention could be applied within a single standard, such that the receiving modem operation could be slowed by zeroing or blacking out the higher frequency subchannels within the bandwidth for a given standard; the receiving modem could then sample and filter at a non-standard configuration, still providing improved data rate performance over the lower frequency subchannels.

In addition, while this invention is described primarily with respect to the ADSL2 and ADSL2+ standards, it is contemplated that it will be similarly applicable, and beneficial, in optimizing among other current and future DSL standards. Accordingly, those skilled in the art having reference to this specification will comprehend that these particular standards are presented herein by way of example only.

The preferred embodiment of this invention, and its variations, provides important advantages in the establishing and carrying out of DSL communications. This invention enables the optimization of receiver-side digital signal processing, without requiring the transmitter to alter its operation or to even be aware of the configuration of the receiver. This invention also enables such optimization without lengthening the initialization or training time required for a communications session, thus maintaining reasonable overhead in connection with the implementation of this invention.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method of receiving multichannel modulation communications at a receiving modem, comprising the steps of:
    receiving known signals from a transmitting modem over a communications facility, the received known signals including components in a first plurality of subchannels in the multichannel modulation signal over a first bandwidth;
    analyzing the received known signals to determine conditions of each of the subchannels in the first bandwidth;
    responsive to the analyzing step, estimating whether data processing capacity at the receiving modem over a lower frequency subset of the first bandwidth is higher than data processing capacity over the first bandwidth; and
    responsive to estimating that data processing capacity over the lower frequency subset is higher, configuring the receiving modem to receive payload data over the lower frequency subset of the first bandwidth; configuring comprising:
        changing a sampling clock frequency for an analog-to-digital converter in the receiving modem from a first sampling frequency corresponding to the highest frequency of the first bandwidth to a second sampling frequency corresponding to the highest frequency of the lower frequency subset of the first bandwidth, the second sampling frequency being at least twice the highest frequency of the lower frequency subset of the first bandwidth.

2. The method of claim 1, further comprising:
    also responsive to estimating that data processing capacity over the lower frequency subset is higher, communicating a bit loading to the transmitting modem over the communications facility for subchannels in the lower frequency subset.

3. The method of claim 1, wherein the configuring step comprises:
    changing a filter characteristic of an analog receive filter in the receiving modem to correspond to the lower frequency subset of the first bandwidth.

4. The method of claim 3, wherein the configuring step further comprises:
    changing a filter characteristic of a digital receive filter in the receiving modem to correspond to the lower frequency subset of the first bandwidth.

5. The method of claim 1, wherein the configuring step further comprises:
    changing a filter characteristic of a digital receive filter in the receiving modem to correspond to the lower frequency subset of the first bandwidth.

6. The method of claim 1, further comprising:
    communicating a signal, over the communications facility to the transmitting modem, indicating that subchannels at frequencies above the highest frequency of the lower frequency subset of the first bandwidth are to carry no payload data.

7. The method of claim 1, further comprising:
    communicating a signal, over the communications facility to the transmitting modem, indicating that subchannels at frequencies above the highest frequency of the lower frequency subset of the first bandwidth are to carry no payload data.

8. A method of receiving multichannel modulation communications at a receiving modem, said method comprising:
    receiving known signals from a transmitting modem over a communications facility, the received known signals including components in a first plurality of subchannels in the multichannel modulation signal over a first bandwidth;
    analyzing the received known signals to determine conditions of each of the subchannels in the first bandwidth;
    responsive to the analyzing step, estimating whether data processing capacity at the receiving modem over a lower frequency subset of the first bandwidth is higher than data processing capacity over the first bandwidth;
    responsive to estimating that data processing capacity over the lower frequency subset is higher, configuring the receiving modem to receive payload data over the lower frequency subset of the first bandwidth;
    after the configuring step, receiving signals corresponding to payload and control messages over the communications facility from the transmitting modem;
    digitally processing the control messages according to a first communications standard; and
    digitally processing the payload messages according to a second communications standard,
    wherein the first communications standard is a higher theoretical data rate standard than the second communications standard,
    wherein the first communications standard enables communications over subchannels in the first bandwidth and
    wherein the second communications standard enables communications over subchannels up to the highest frequency of the lower frequency subset of the first bandwidth.

9. A digital communications transceiver, comprising:
    analog front end circuitry, comprising an analog receive filter and an analog-to-digital converter, for coupling to a communications facility;
    an interface for coupling to a host system; and
    circuitry, coupled to the analog front end circuitry and to the interface, and programmed to process a multichannel modulation signal received over the communications facility, according to a sequence of operations comprising:
        receiving known signals from a transmitting modem over the communications facility, the received known signals including components in a first plurality of subchannels in the multichannel modulation signal over a first bandwidth;

analyzing the received known signals to determine conditions of each of the subchannels in the first bandwidth;

responsive to the analyzing operation, estimating whether data processing capacity at the receiving modem over a lower frequency subset of the first bandwidth is higher than data processing capacity over the first bandwidth; and responsive to estimating that data processing capacity over the lower frequency subset is higher, configuring the receiving modem to receive payload data over the lower frequency subset of the first bandwidth, configuring comprising:

changing a sampling clock frequency for the analog-to-digital converter from a first sampling frequency corresponding to the highest frequency of the first bandwidth to a second sampling frequency corresponding to the highest frequency of the lower frequency subset of the first bandwidth, the second sampling frequency being at least twice the highest frequency of the lower frequency subset of the first bandwidth.

10. The transceiver of claim 9, wherein the sequence of operations further comprises:

also responsive to estimating that data processing capacity over the lower frequency subset is higher, communicating a bit loading to the transmitting modem over the communications facility for subchannels in the lower frequency subset.

11. The transceiver of claim 9, wherein the configuring operation comprises:

changing a filter characteristic of the analog receive filter to correspond to the lower frequency subset of the first bandwidth.

12. The transceiver of claim 9, wherein the circuitry further comprises:

a digital receive filter, for applying a digital filter to received signals processed by the analog front end;

and wherein the configuring operation comprises:

changing a filter characteristic of the digital receive filter in the receiving modem to correspond to the lower frequency subset of the first bandwidth.

13. The transceiver of claim 9, wherein the circuitry further comprises:

a digital receive filter, for applying a digital filter to received signals processed by the analog front end;

and wherein the configuring operation comprises:

changing a filter characteristic of the digital receive filter in the receiving modem to correspond to the lower frequency subset of the first bandwidth; and changing a filter characteristic of the analog receive filter to correspond to the lower frequency subset of the first bandwidth.

14. The transceiver of claim 9, wherein the sequence of operations further comprises:

communicating a signal, over the communications facility to the transmitting modem, indicating that subchannels at frequencies above the highest frequency of the lower frequency subset of the first bandwidth are to carry no payload data.

15. The transceiver of claim 9, wherein the sequence of operations further comprises:

after the configuring operation, receiving signals corresponding to payload and control messages over the communications facility from the transmitting modem;

digitally processing the control messages according to a first communications standard; and digitally processing the payload messages according to a second communications standard.

16. The transceiver of claim 9, wherein the circuitry comprises a digital signal processing subsystem programmed to perform the sequence of operations.

17. A method of establishing multichannel modulation communications at a receiving modem, comprising the steps of:

receiving known signals from a transmitting modem over a communications facility, the received known signals including components in a first plurality of subchannels in the multichannel modulation signal according to a first digital subscriber line (DSL) standard;

performing channel discovery using the received known signals according to the first DSL standard;

responsive to the channel discovery, estimating whether data processing capacity at the receiving modem according to a second DSL standard is higher than data processing capacity according to the first DSL standard;

responsive to estimating that data processing capacity according to the second DSL standard is higher, configuring the receiving modem to receive payload data according to the second DSL standard; configuring comprising:

changing a filter characteristic of at least one receive filter in the receiving modem to correspond to the lower frequency bandwidth of the second DSL standard;

communicating a bit loading to the transmitting modem over the communications facility for subchannels according to the second DSL standard, wherein the second DSL standard enables communications over a lower frequency bandwidth than the first DSL standard; and changing a sampling clock frequency for an analog-to-digital converter in the receiving modem from a first sampling frequency corresponding to the highest usable frequency according to the first DSL standard to a second sampling frequency corresponding to the highest frequency of the lower frequency bandwidth, the second sampling frequency being at least twice the highest frequency of the lower frequency bandwidth.

18. The method of claim 17, further comprising:

communicating a blackout signal over the communications facility to the transmitting modem, indicating that subchannels at frequencies above the lower frequency bandwidth are to carry no payload data.

19. The method of claim 17, further comprising:

after the configuring step, receiving signals corresponding to payload and control messages over the communications facility from the transmitting modem;

digitally processing the control messages according to the first DSL standard; and digitally processing the payload messages according to the second DSL standard.

20. The method of claim 17, wherein the first DSL standard is ADSL2+, and wherein the second DSL standard is ADSL2.

* * * * *